United States Patent
Mueller et al.

(10) Patent No.: US 6,867,915 B2
(45) Date of Patent: Mar. 15, 2005

(54) MICROSCOPE FOR REFLECTED-LIGHT AND TRANSMITTED-LIGHT MICROSCOPY

(75) Inventors: Gerhard J. Mueller, Berlin (DE); Ralf Wolleschensky, Schoeten (DE)

(73) Assignee: Carl Zeiss Jena GbmH, Jena (DE)

( * ) Notice: Subject to any disclaimer, the term of this patent is extended or adjusted under 35 U.S.C. 154(b) by 0 days.

(21) Appl. No.: 10/359,230

(22) Filed: Feb. 6, 2003

(65) Prior Publication Data

US 2003/0137725 A1 Jul. 24, 2003

Related U.S. Application Data

(62) Division of application No. 09/658,321, filed on Sep. 8, 2000, now abandoned.

(30) Foreign Application Priority Data

Sep. 9, 1999 (DE) .......................................... 199 42 998

(51) Int. Cl.⁷ .......................... G02B 21/06; G02B 21/00
(52) U.S. Cl. ........................ 359/386; 359/368; 359/376
(58) Field of Search ................................ 359/368–390; 351/200–246

(56) References Cited

U.S. PATENT DOCUMENTS

| | | | | |
|---|---|---|---|---|
| 2,601,175 A | * | 6/1952 | Smith | 359/371 |
| 4,515,445 A | * | 5/1985 | Muller et al. | 359/386 |
| 4,863,252 A | * | 9/1989 | McCarthy et al. | 359/376 |
| 5,035,476 A | * | 7/1991 | Ellis et al. | 359/202 |
| 6,226,118 B1 | * | 5/2001 | Koyama et al. | 359/380 |

FOREIGN PATENT DOCUMENTS

| | | | | |
|---|---|---|---|---|
| DE | 26 31 551 | | 2/1978 | |
| JP | 5-288992 | * | 11/1993 | 359/386 |
| JP | 11-30753 | * | 2/1999 | 359/380 |

* cited by examiner

Primary Examiner—Thong Q Nguyen
(74) Attorney, Agent, or Firm—Reed Smith LLP

(57) ABSTRACT

A microscope is disclosed in which a specimen is arranged between two objectives and can be observed with reflected light as well as with transmitted light. In a microscope with field transmission, two objectives have substantially identical optical characteristics and at least one of the two objectives is followed by a mirror which reflects the light transmitted through the specimen back into itself exactly. In this way, there is twofold transmission through the specimen with optimum illumination of the solid angle. In a laser scanning microscope, there are likewise two objectives with substantially identical optical characteristics and at least one of the objectives is followed by a phase-conjugating or adaptive mirror.

4 Claims, 2 Drawing Sheets

MICROSCOPE FOR REFLECTED-LIGHT AND TRANSMITTED-LIGHT MICROSCOPY

This is a divisional application of parent U.S. patent application Ser. No. 09/658,321 filed Sep. 8, 2000 now abandoned, which claims priority of DE 199 42 998.7 filed September 9, 1999, priority to both of which is also claimed herein. The disclosures of these priority applications are incorporated herein by reference.

BACKGROUND OF THE INVENTION

1. Field of the Invention

The invention is directed to a microscope in which a specimen is arranged between two objectives and can be observed with reflected light as well as with transmitted light.

2. Description of the Related Art

An important concern in further developments in microscopy at present is to provide and perfect methods and arrangements which make it possible to observe objects by twofold transmission with reflected light as well as with transmitted light, which serves to increase both resolving capacity and contrast.

In this regard, there are already known arrangements in which incident light transmitted by the object is reflected back to the rear of the object again by a reflecting device. The invention described in the following also belongs to this class of arrangement.

An early solution using a reflecting device for the light transmitted by the object is described in DE 10 83 065. In this case, there is provided in the beam path behind the object a multiple corner reflector or triple mirror which depolarizes the polarized light of the vertical or incident illumination and cooperates with a crossed analyzer arranged in the observation beam path in such a way that only the depolarized beam component proceeding from the triple mirror can pass the analyzer and thus result in a transmitted-light image of the object illuminated by incident light.

However, because of the influence of image errors (aberrations, etc.) and alignment or adjustment inaccuracies, the image of the object to be observed has relatively weak lighting and poor contrast.

A further development in this respect according to DE 32 04 686 A1 provides an optical system for transmitted-light microscopy with vertical or incident illumination in which it is attempted by means of a specially constructed reflecting device to allow light beams which pass through the object and are then reflected upon the object again to pass identical object points in both directions. For this purpose, it is suggested that, for example, an autocollimation system with optics which image the back of the object onto a plane mirror and image the occurring image on the underside of the object is used as a reflecting device. An improved contrast enhancement can be achieved with this system and the arrangement developed from it. In order to prevent aperture losses, the autocollimation system comprises, for example, two objectives with infinite output back focal distance or output intersection length, wherein the object plane and the surface of the plane mirror lie in the focal point of the two objectives.

However, the reflection carried out in this manner also has alignment inaccuracies and image errors, as a result of which the light is not exactly parallel after the second objective or the object to be observed is not imaged onto itself with lateral and vertical precision.

OBJECT AND SUMMARY OF THE INVENTION

On this basis, it is the primary object of the invention to increase efficiency in reflection and to ensure that the transmitted incident light is reflected back in itself again with high accuracy by the reflecting device.

According to the invention, this object is met in a microscope in which a specimen is positioned between two objectives having optical characteristics that are as identical as possible and at least one of the two objectives is followed by a mirror which reflects the light transmitted through the specimen back into itself exactly, so that there is optimum illumination when light is transmitted twice through the preparation. The image of the entire specimen volume obtained in this way can be observed in the observation beam path of a microscope with field-transmitting operation, wherein one of the two objectives serves as a microscope objective and the second objective is part of a reflecting device.

The reflector surface of the mirror which is arranged subsequent to the reflecting objective is not plane as is the case in the prior art, but has a spherical curvature which, to a first approximation, is adapted to the wavefront of the reflecting objective. The reflector surface is preferably curved aspherically and is accordingly adapted to the output wavefront of the reflecting objective.

In a particularly preferred embodiment of the invention, the two objectives have the same numerical aperture (NA) and also conform to one another as far as possible with respect to other characteristics, wherein both objectives are preferably constructed as planaprochromats with a NA greater than or equal to 1.4.

In another possible embodiment of the invention, there is a coherent illumination source and the mirror provided in the reflecting device is constructed as a phase-conjugating mirror. Random disturbances are optimized in real time with the phase conjugation in that an electromagnetic wave is generated at the phase-conjugating mirror surface, which electromagnetic wave not only propagates in the opposite direction, as is desired, but, beyond this, also has a reversed phase distribution or an opposite sign of the phase.

Accordingly, in contrast to the conventional mirror, the distortion of the wavefront is corrected, as a result of which the light is imaged through the second objective again exactly in the focus of the microscope objective. Compensation of losses which still occur in the prior art due to imaging errors and alignment inaccuracies is substantially improved in this way.

When a laser source is used for illumination in connection with the construction according to the invention, nonlinear phenomena can be utilized very favorably because the probability of multiphoton absorption is substantially increased due to the bundling of the laser light when passing through the specimen two times. When the laser light is coupled into the microscope beam path via a dichroic beam splitter, the doubled wavelength which is diffusely reflected by the specimen can be observed in a simple manner.

It also lies within the scope of the invention to provide another mirror and to position this other mirror between the microscope objective and eyepiece in such a way that the specimen is imaged on this mirror through the microscope objective. This constructional variant is especially relevant for fluorescence microscopy, wherein this mirror passes the illumination beam but does not pass a selected beam component coming from the specimen, e.g., the fluorescence radiation.

With an arrangement of this type, the two objectives which are located opposite one another symmetrically with respect to the specimen with homogeneous immersion advantageously form an optical resonator by which very small phase interferences introduced in the resonator by the specimen can be detected and can accordingly provide information about the specimen with high resolution.

BRIEF DESCRIPTION OF THE DRAWINGS

The invention will be described more fully in the following with reference to two embodiment examples.
In The Drawings.

DESCRIPTION OF THE PREFERRED EMBODIMENTS

Figure 1:
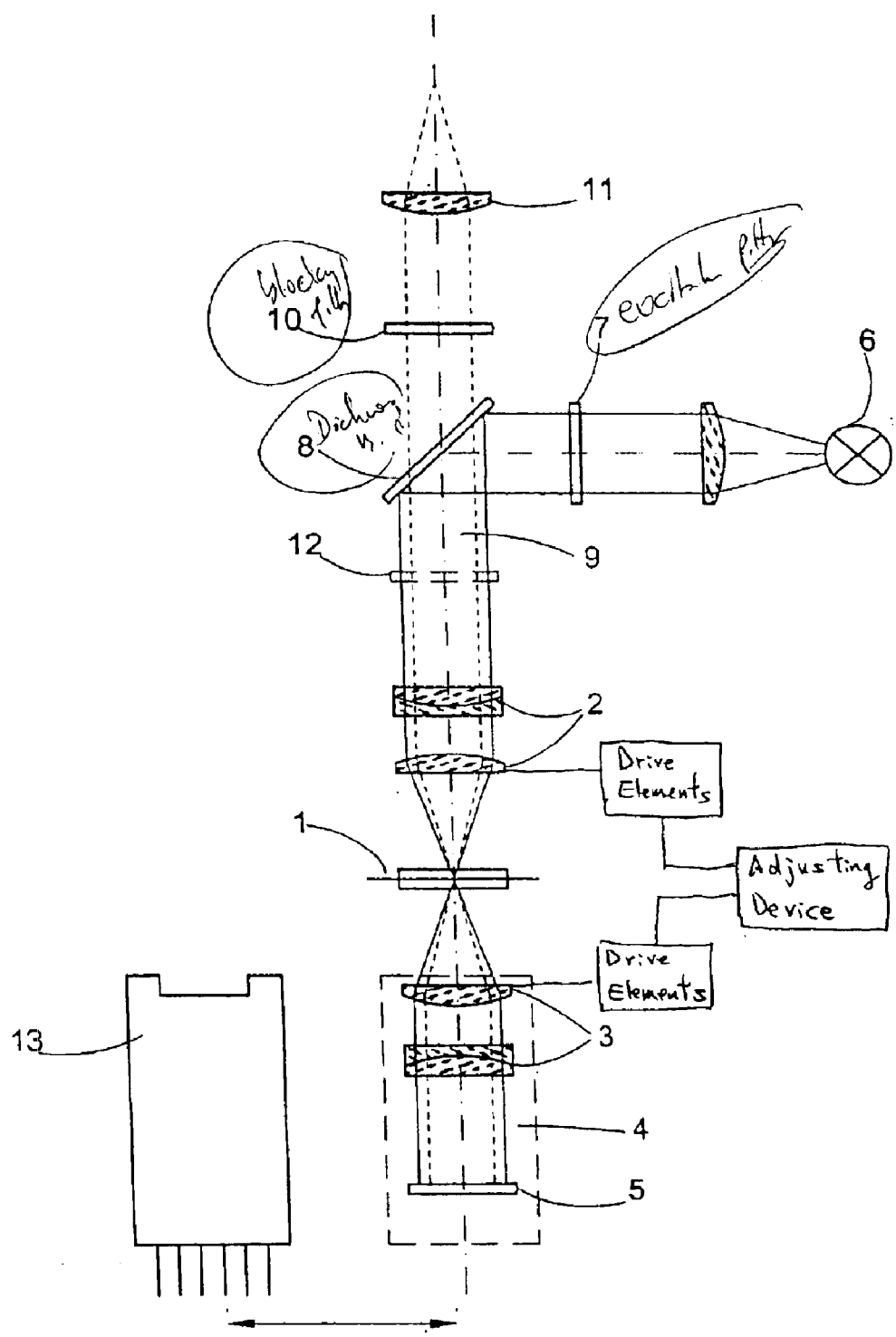
FIG. 1 shows the arrangement according to the invention in a field-transmitting microscope.

In FIG. 1, a specimen 1 is received between the microscope objective 2 and another objective 3 which is identical to the microscope objective 2 with respect to its optical characteristics and which is part of a reflecting device 4. Optimum resolutions result when, for example, planaprochromats with a numerical aperture greater than or equal to 1.4 are used for both objectives 2, 3.

It is further advantageous when the preparation is received between two identical, high-grade cover glasses which ensure a perfectly symmetrical beam path.

A mirror 5 which reflects the light transmitted through the specimen 1 back into itself exactly is arranged in the reflecting device 4 following the objective 3. The reflecting surface of the mirror 5 is not plane, but rather has a sphere which is adapted to the wavefront of the objective 3 to a first approximation. In a particularly preferred manner, the mirror surface is curved aspherically and adapted to the output wavefront of the objective 3.

Particularly in fluorescence microscopy, to which the present example pertains, the illumination light proceeding from a light source 6 is reflected through an excitation filter 7 into the dichroic beam splitter 8 and impinges on the specimen 1. The fluorescent light which now proceeds from the specimen 1 radiates in the entire solid angle and is accordingly detected by the microscope objective 2 as well as by objective 3. After traversing the objective 3, the fluorescent light is parallel and impinges on the mirror 5 by which it is reflected back precisely in the focus of the microscope objective 2 and is collected by the microscope objective 2; after passing through the dichroic beam splitter 8, the blocking filter 10 and the eyepiece 11, it is now available for observation (or other evaluation).

Insofar as a laser is provided as illumination source and the observation of the specimen 1 is carried out in coherent light, a phase-conjugating mirror can advantageously be provided as mirror 5, the use of which ensures that the light impinging on the mirror surface is reflected back into itself in a highly accurate manner as intended.

The microscope can accordingly be operated with excitation by transmitted light as well as reflected light. The excitation filter 7 ensures that only the excitation beam reaches the microscope beam path 9 from the illumination source 6. On the other hand, the blocking filter 10 passes only the fluorescent light which is emitted by the specimen and which is to be evaluated.

The dichroic beam splitter 8 reflects the short-wave excitation light coming from the illumination source 6 and passes the longer-wave fluorescent light proceeding from the specimen 1. The excitation light is accordingly directed onto the specimen 1, while the fluorescent radiation collected by the microscope objective 2 and objective 3 passes through the beam splitter 8 and the blocking filter 10 to the eyepiece 11 and into the eye of the observer.

As is indicated in FIG. 1, a partially-transmitting mirror 12 can be provided in the microscope beam path 9 between the microscope objective 2 and the beam splitter 8. When this mirror 12 is constructed in such a way that it transmits the illumination wavelength but reflects the fluorescence wavelength back onto the specimen again, the microscope objective 2 and the objective 3 form the optical resonator, mentioned above, by which very small phase interferences can be detected.

It is further shown in FIG. 1 that the reflecting device 4 can be exchanged with a photomultiplier 13. This can be accomplished by means of a swiveling device so that the arrangement can be configured for photometric transmitted-light measurements without cumbersome conversion.

Figure 2:
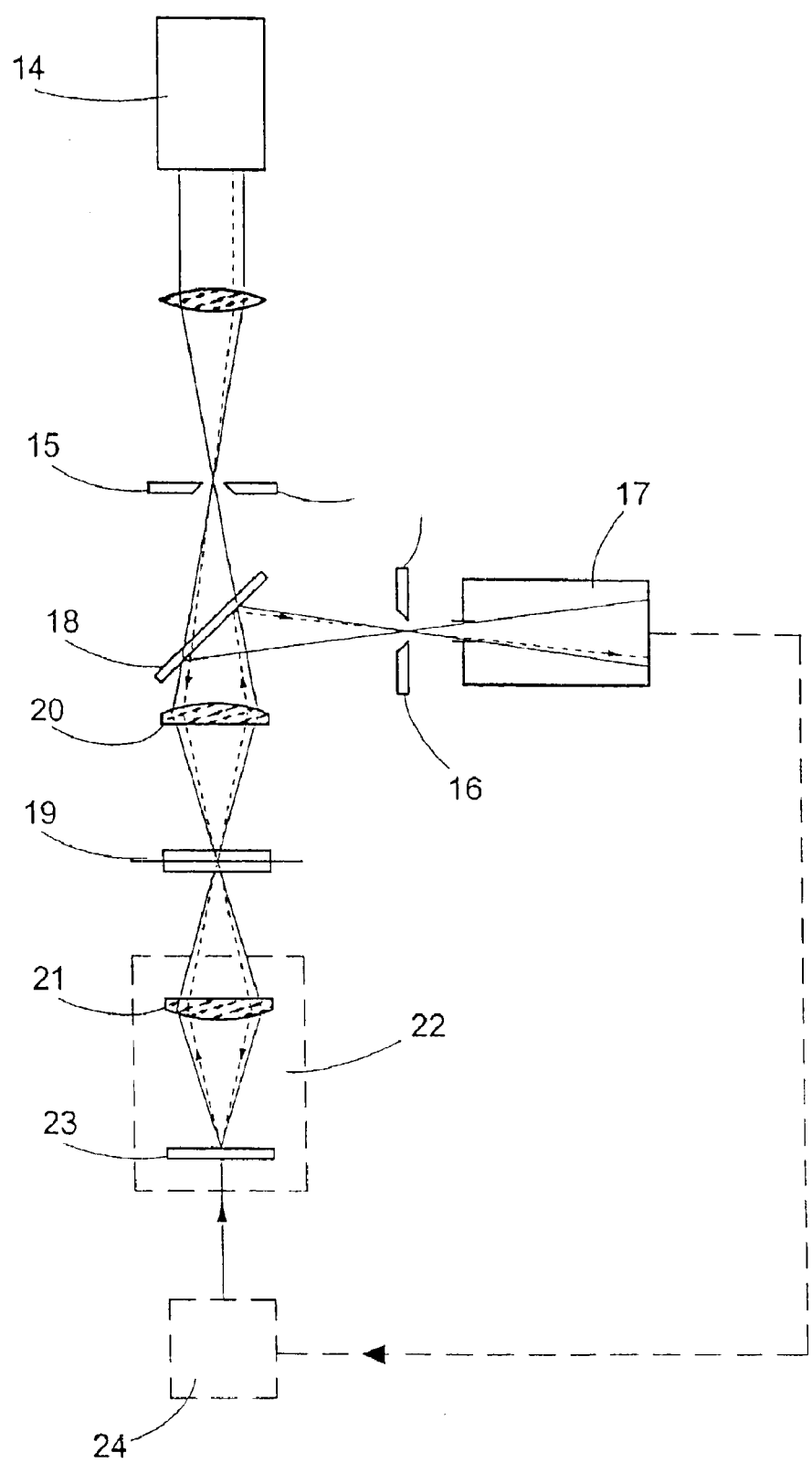
FIG. 2 shows the arrangement according to the invention in a confocal laser scanning microscope.

FIG. 2 shows a schematic view of a laser scanning microscope with a laser 14, a pinhole diaphragm 15 arranged in the laser beam path, a measurement diaphragm 16 conjugated to the pinhole diaphragm 15, a detector 17, and a beam splitter 18.

The pinhole diaphragm 15 which is irradiated with laser light is imaged in the specimen 19, wherein the latter is illuminated with the intensity distribution of an Airy disk. In doing so, a point on the specimen 19 is aimed for and an image of this point is formed on the measurement diaphragm 16, wherein the position and size of this image can be evaluated by the detector 17. The measurement diaphragm 16 can only pass light from an adjusted focal plane.

In this case, also, the specimen 19 is located between two objectives in a manner analogous to the first embodiment example (according to FIG. 1); one of these objectives forms the microscope objective 20 and another objective 21 is part of a reflecting device 22. A mirror 23 is arranged inside the reflecting device 22 following objective 21 and can be constructed as a phase-conjugating or adaptive mirror. With a mirror of this kind (as was already shown with reference to the field-transmitting system), the laser light transmitted from the specimen 19 is reflected back into itself exactly with respect to direction and phase front.

For the special case in which the mirror 23 is constructed as an adaptive mirror and is outfitted with actuating elements for deformation of its mirror surface, a control circuit 24 can be provided, as is indicated in FIG. 2, which is connected with the detector 17 on the input side and with the actuating elements of the adaptive mirror 23 on the output side.

For example, when the control circuit 24 is programmed in such a way that it sends actuating signals to the adaptive mirror 23 depending on the radiation intensity received by the detector 17, it is achieved in an advantageous manner that by appropriate actuation of the actuating elements the curvature of the mirror surface is automatically adjusted such that the detector 17 can receive a fluorescent radiation of maximum intensity proceeding from the specimen 19.

As in the first embodiment example according to FIG. 1, the objectives 20 and 21 located opposite one another symmetrically with respect to the specimen 19 should also be identically constructed with respect to their optical parameters and the specimen 19 should be prepared between two optically identical, high-grade cover glasses.

The adaptive mirror 23 can be constructed in the manner described in detail in DE 26 31 551, for example, so that a more exhaustive treatment herein can be dispensed with.

While the foregoing description and drawings represent the present invention, it will be obvious to those skilled in the art that various changes may be made therein without departing from the true spirit and cope of the present invention.

It is possible, and also lies within the scope of this invention, to arrange diaphragms, Wollaston prisms, polarizers or analyzers and/or other subassemblies for optical contrasting in the beam path in a known manner. Any optical contrasting methods by which artificial contrasting can be achieved without harmful intervention in the preparation can be used, i.e., darkfield methods, phase contrast methods in which phase shifts are converted to brightness values, polarization contrast methods for observing birefringent specimens, generation of a differential interference contrast (DIC) and, above all, fluorescence contrasting.

This last embodiment can therefore be applied advantageously above all in fluorescence microscopy because the fluorescent light emitted by the specimen has a very low intensity in comparison to the exciting light. In the suggested manner, the fluorescent light that is not directly detected by the microscope objective can be detected by means of the second objective in the reflecting device and is reflected back again into the focus of the microscope objective. It is collected in the latter and used as an additional basis for detection.

The invention is further directed to a laser scanning microscope in which a light-transmitting specimen is again positioned between two objectives with at least approximately identical optical characteristics and a mirror is arranged following at least one objective, wherein this mirror is constructed as a phase-conjugating or adaptive mirror by which the wavefront of the reflected light is made to coincide with the wavefront of the transmitted light and the light is reflected back into itself exactly with respect to direction and phase front.

In this way, the advantages of the arrangement according to the invention can also be utilized particularly for confocal laser scanning microscopy. Optical scanning in which a light point deflected by oscillating mirrors or rotating polygon prism mirrors sweeps over the object has proven successful in this connection. Pinhole diaphragms conjugated in the illumination and observation beam path ensure that only the light from the respective adjusted focal plane reaches the detector. In this way, spatially resolved and time-resolved data can be obtained in a known manner, but, thanks to the construction of the arrangement according to the invention, with substantially higher efficiency than in the known prior art.

As was already mentioned, the mirror surface of the phase-conjugating mirror is constructed in such a way that the wavefront of a plane wave is changed after being reflected on the mirror surface such that distortions are corrected and the reflected light is reflected back into itself exactly.

On the other hand, the adaptive mirror which can be used alternatively is provided with a deformable mirror surface arranged on a diaphragm, wherein a plurality of individual electrodes are located opposite the diaphragm on its side remote of the mirror surface and electric voltage is applied to the diaphragm on the one hand and to the electrodes on the other hand; the desired deformation of the diaphragm is triggered by changing the voltages, and accordingly the electrostatic forces, acting between the diaphragm and electrodes.

In this regard, control is carried out depending on the image quality that has been achieved and, as the result of corresponding deformation of the mirror surfaces, causes the light reflected by the mirror to be reflected back exactly in itself and image errors and alignment inaccuracies are compensated.

The adaptive mirror can also be constructed in such a way that the diaphragm is connected, on its side remote of the mirror surface, to a plurality of individual piezoelectric drives and the deformation of the diaphragm is brought about by controlling the piezoelectric drives in different ways.

The electrodes and/or the piezoelectric drives with which the deformable mirror surfaces are coupled can communicate with a detection device via an evaluating unit for a beam component which is coupled out of the observation beam path. The beam component is assessed according to intensity, for example, wherein an intensity signal is obtained and taken as basis for determining an actuating signal for deformation of the mirror diaphragm.

This further development of the inventive idea is applicable in fluorescence microscopy in a particularly preferred manner in that the intensity of the fluorescent radiation proceeding from the specimen is assessed.

In other constructional variants of the invention relating to field-transmitting and scanning systems, the reflecting device can be constructed as a brightfield arrangement having two objectives which together form an optical system with an infinite output intersection length.

Further, it is advantageous, particularly with respect to applications for microphotometry, when the reflecting device can be swiveled out of the microscope beam path and a photomultiplier can be swiveled in in its place for transmitted-light detection. In this way, no cumbersome modification or adjustments are required for changing to photometric measurements.

Another construction of the field-transmitting and laser scanning microscope consists in that at least one of the objectives is connected with an adjusting device for displacement in axial and/or radial direction and the adjustment is carried out depending on the achieved image quality or intensity and/or contrast. This adjusting possibility is advantageous particularly for adjusting the optical resonator mentioned above. In this case, piezomechanical drive elements above all have proven successful as actuating drives.

However, this possibility of axial and/or radial adjustment serves not only for the adjustment of the optical resonator, but also opens the door to more or less novel contrasting methods, especially when adjustment accuracies in the sub-micrometer range, preferably in the range of several hundred nm, are realized. Such accuracy can readily be achieved with piezo actuating elements, and phase interference and differential interference contrasting methods can be further developed in this way in terms of their efficiency.

Reference Numbers 1 specimen
2 microscope objective
3 objective
4 reflecting device
5 mirror
6 illumination
7 excitation filter
8 dichroic beam splitter
9 microscope beam path
10 blocking filter
11 eyepiece
12 partially transmitting mirror 13 photomultiplier
14 laser
15 pinhole diaphragm
16 measurement diaphragm
17 detector
18 beam splitter
19 specimen
20 microscope objective
21 objective
22 reflecting device
23 mirror
24 control circuit.

What is claimed is:

1. A microscope comprising:

two objectives between which a light-transmitting specimen is arranged;

said objectives having at least substantially identical optical characteristics; and at least one of said two objectives being followed by a mirror for reflecting light transmitted through the specimen back into itself exactly;

wherein another mirror is provided between one of said objectives and an eyepiece, the specimen being imaged on the another mirror through said one of said objectives, wherein this mirror passes an illumination beam but does not pass a selected fluorescent radiation component coming from the specimen.

2. The microscope according to claim 1, wherein and said mirror for reflecting light can be swiveled out of a microscope beam path and a photomultiplier can be swiveled in its place for transmitted-light detection.

3. The microscope according to claim 1, wherein:

at least one of the objectives is connected with adjusting devices for displacement in axial and/or radial direction and the adjustment is carried out depending on the observation beam path with respect to its intensity or contrast; and wherein the adjusting devices are coupled with drive elements.

4. The microscope according to claim 3, wherein said drive elements are piezomechanical drive elements.

* * * * *